(12) United States Patent
Ropp

(10) Patent No.: US 6,817,653 B2
(45) Date of Patent: Nov. 16, 2004

(54) FULL ACCESS MODULAR UTILITY TRAILER

(76) Inventor: David A. Ropp, 836 Hannah AV, Traverse City, MI (US) 49686

(*) Notice: Subject to any disclaimer, the term of this patent is extended or adjusted under 35 U.S.C. 154(b) by 256 days.

(21) Appl. No.: 10/131,054

(22) Filed: Apr. 23, 2002

(65) Prior Publication Data

US 2002/0153747 A1 Oct. 24, 2002

Related U.S. Application Data

(60) Provisional application No. 60/286,066, filed on Apr. 24, 2001.

(51) Int. Cl.$^7$ ................................................ B60P 3/14
(52) U.S. Cl. ......................... 296/181; 296/21; 296/24.1; 224/403
(58) Field of Search ............................. 296/10, 14, 21, 296/22, 24.1, 37.1, 37.6, 50, 56, 181, 182, 183; 280/783; 224/400, 401, 402, 403, 404

(56) References Cited

U.S. PATENT DOCUMENTS

| | | | | |
|---|---|---|---|---|
| 2,365,940 A | * | 12/1944 | Couse | 296/24.1 |
| 3,135,544 A | * | 6/1964 | Mickey et al. | 296/24.1 |
| 3,633,970 A | * | 1/1972 | Langhals | 296/24.1 |
| 3,667,635 A | * | 6/1972 | Hackney | 414/498 |
| 3,705,743 A | * | 12/1972 | Toomey | 296/168 |
| 3,734,540 A | * | 5/1973 | Thiermann | 280/482 |
| 4,055,206 A | * | 10/1977 | Griffin | 144/285 |
| 4,103,956 A | * | 8/1978 | Faulstich | 296/10 |
| 4,126,349 A | * | 11/1978 | Nelson et al. | 296/24.1 |
| 4,133,572 A | * | 1/1979 | Robbins et al. | 296/168 |
| 4,441,754 A | * | 4/1984 | Hantel | 296/51 |
| 4,659,132 A | * | 4/1987 | Day | 296/24.1 |
| 4,981,318 A | * | 1/1991 | Doane et al. | 296/24.1 |
| 5,238,283 A | * | 8/1993 | Teigen | 296/24.1 |
| 5,383,698 A | * | 1/1995 | Buchholz | 296/24.1 |
| 5,383,703 A | * | 1/1995 | Irvine, III | 296/181 |
| 5,593,201 A | * | 1/1997 | Bateman | 296/100.02 |
| 5,845,952 A | * | 12/1998 | Albertini et al. | 296/37.6 |
| 6,022,067 A | * | 2/2000 | Hargett et al. | 296/183 |
| 6,068,324 A | * | 5/2000 | DeKlotz | 296/100.06 |
| 6,089,639 A | * | 7/2000 | Wojnowski | 296/37.6 |
| 6,131,982 A | * | 10/2000 | Gros | 296/37.6 |
| 6,142,549 A | * | 11/2000 | Clare et al. | 296/37.6 |
| 2002/0109376 A1 | * | 8/2002 | Gruich | 296/183 |
| 2002/0153747 A1 | * | 10/2002 | Ropp | 296/181 |

FOREIGN PATENT DOCUMENTS

| | | | | |
|---|---|---|---|---|
| GB | 2198394 A | * | 6/1988 | 296/181 |
| JP | 01-119445 A | * | 5/1989 | 296/37.1 |

* cited by examiner

*Primary Examiner*—Stephen T. Gordon
*Assistant Examiner*—Paul Chenevert
(74) *Attorney, Agent, or Firm*—Donald W. Meeker

(57) ABSTRACT

A series of structural panels are installed on a bed of a trailer or truck and interconnected by channels to support a roof structure and roll-up or swing-up doors between panels. Storage and display spaces between panels use V-channels and U-channels as long bins or shelving with sides. A doorway at the back end allows access to an interior aisle between the storage and display spaces. A pivotable ramp to the back doorway pivots up to form part of the door.

10 Claims, 3 Drawing Sheets

FULL ACCESS MODULAR UTILITY TRAILER

CLAIM OF PROVISIONAL APPLICATION RIGHTS

This application claims the benefit of U.S. Provisional Patent Application No. 60/286,066, filed on Apr. 24, 2001.

BACKGROUND OF THE INVENTION

1. Field of the Invention

The present invention relates to utility trailers and in particular to a modular utility trailer providing full and easy access to all tools and equipment stored in the trailer including a full walk-in central storage area with a folding down door forming a ramp and side storage compartments with open up doors for full direct access.

2. Description of the Prior Art

Most service professions require tools and equipment. Many trades and services require traveling to a remote location for doing the work, whether it be construction, repairs, servicing, or whatever.

Having a means of transporting and a means of easy access to tools and equipment is vital to the success of people who travel with their tools and equipment. While many attempts have been made to provide means for transporting tools and equipment, none provide complete easy access to all of the tools in a transporting vehicle which is easy and relatively inexpensive to fabricate.

U.S. Pat. No. 4,133,572, issued Jan. 9, 1979 to Robbins, provides a utility trailer with tool and equipment storage bins and power tools, but uses folding and retractable sides rather than roll-up doors and lacks a central storage area and built-in ramp.

U.S. Pat. No. 5,383,703, issued Jan. 24, 1995 to Irvine, shows a modular trailer which can be configured in different ways to produce different storage spaces. It uses tilt up side panels.

U.S. Pat. No. 4,055,206, issued Oct. 25, 1977 to Griffin, claims a composite shop trailer which folds into a compact size for traveling and primarily houses large shop power equipment.

U.S. Pat. No. 5,383,698, issued Jan. 24, 1995 to Buchholz, describes a tool trailer for use in the construction trade, which trailer folds down for traveling and opens up to use power tools and other tools housed inside. It has an end which opens on three sides to permit access to a power saw for working on large pieces of wood.

U.S. Pat. No. 2,365,940, issued Dec. 26, 1944 to Couse, discloses a traveling workshop, which is a truck with a canopy top and removable side rails containing construction tools.

Four patents relate to "beverage" trucks having roll-up doors on the sides for accessing bottle stored in separate compartments. They include U.S. Pat. No. 3,135,544, issued Jun. 2, 1964 to Mickey, U.S. Pat. No. 5,238,283, issued Aug. 24, 1993 to Teigen, U.S. Pat. No. 6,022,067, issued Feb. 8, 2000 to Hargett, and U.S. Pat. No. 4,659,132, issued Apr. 21, 1987 to Day.

There still remains a need for an inexpensive, easy to fabricate means to transport tools and equipment to distant work sites which also allows complete and easy access to all of the tools and equipment.

SUMMARY OF THE INVENTION

An object of the present invention is to provide a tool and equipment display trailer that is easily and inexpensively fabricated from modular components.

Another object of the present invention is to provide a tool and equipment and display trailer having a walk-in central storage area with full access to all tools and equipment stored inside.

One more object of the present invention is to provide a fold-down door or partial door in association with the central storage area, wherein the door is hinged to open downwardly to form a ramp into the central storage area.

An additional object of the present invention is to provide roll-up or swing-up doors around the perephery of the trailer to allow complete and easy access to all of the tools and equipment stored in compartments around the outside of the trailer.

A further object of the present invention is to provide modular building components, such as panels and structural beams, and also use modular elements for storage, such as V-channels and U-channels upside down for storage.

In brief, an enclosed storage modular utility and display trailer transports tools and equipment and supplies typically used by any skilled tradesmen, craftsman, hobbyist and displays for selling. The storage area is mounted on a standard equipment trailer frame allowing a gross vehicle weight of 6,000 lbs per 12 lineal feet to enable the storage of many tools and supplies as well as heavy equipment.

The utility trailer is constructed of pre-formed panels, and variously shaped beams assembled on the trailer frame. There are two sizes of upright panels. The two front panels when joined vertically at the middle form the front wall of the trailer and provide support for the over head door tracks and mounting. The panels are fastened to the floor of the trailer as they are placed for fast and easy construction. The smaller panels are placed upright at the middle and back of the trailer. The back panels form the back wall of the trailer and provide an opening between them for the rear combined hatch door and ramp. The center panels are placed at a point some what more than half way along the length of the trailer to provide an appropriate opening for the overhead doors. These panels together form the support for the main header that runs along the top length of the trailer and supports the roof beams.

All of the panels provide an area to fasten the overhead door track and other door hardware and supports. The two main headers are shaped like a "J". The J shape provides strength and a gutter to channel water from the roof. The main headers run the full length of the trailer and tie all of the upright panels together at the top.

Roof beams are laid across the width of the trailer and fastened to the top of the two headers. This ties the headers and panels together across the width of the trailer. A preassembled combination ramp and lift-up hatch door are fastened at a pivot point.

Overhead doors, manufactured by TRAC-RITE, are placed according to manufacturers suggested installation procedure between the front, center and rear panels to form the side walls of the storage unit.

A metal skin is fastened over the top of the roof beams and main header to form a water proof top.

A variety of shelving, bins, and tool hanging grids are fastened lengthwise between the upright panels. The shelving and bins are placed at an angle off of vertical to cradle any tools or inventory items that are placed on them. The tool grid is placed at an angle of aproximately 25 degrees off of vertical. This allows all tools or inventory to lay against the grid so that they don't fall off their hangers during transit.

The variety of shelving, bins, tool hanging grids, and other devices for inventory or tool storage may vary in shape according to specific storage needs but, the concept of angling off the vertical remains constant.

The tool grid is manufactured from the proper sized piece of ¾" expanded sheet metal with a frame fastened around it's perimeter made from sheet metal formed in an l shape.

An advantage of the present invention is that it provides an economical and efficient means for safely transporting and storing tools, equipment, supplies, and displays in a trailer with complete and easy access to all of the tools, equipment, supplies, and displays.

Another advantage of the present invention is that by using modular structural components for the structural elements as well as for the storage and display elements a relatively inexpensive and very strong utility trailer is produced.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
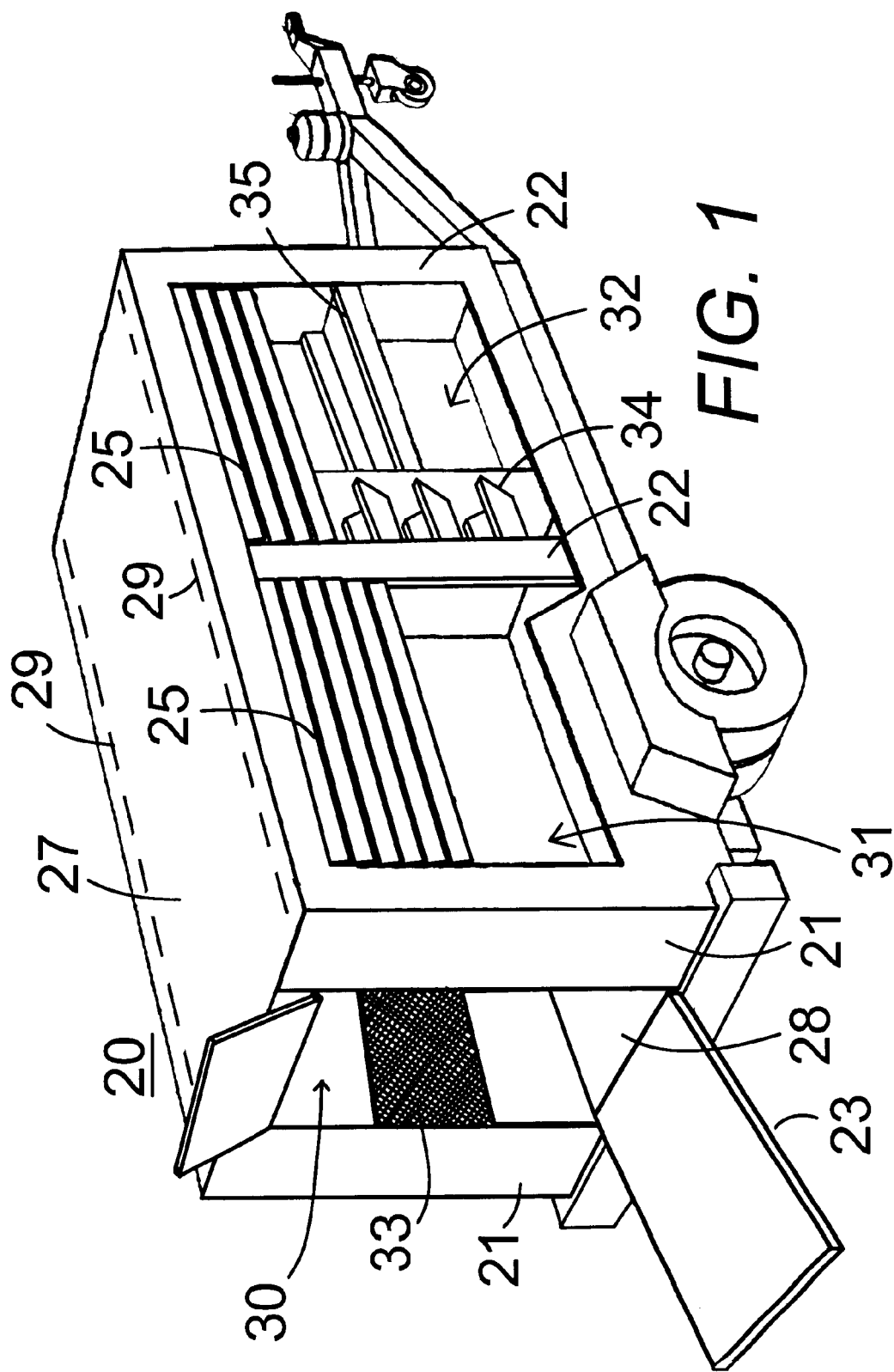
FIG. 1 is a perspective view of the modular utility trailer of the invention having roll-up doors.
Figure 1A:
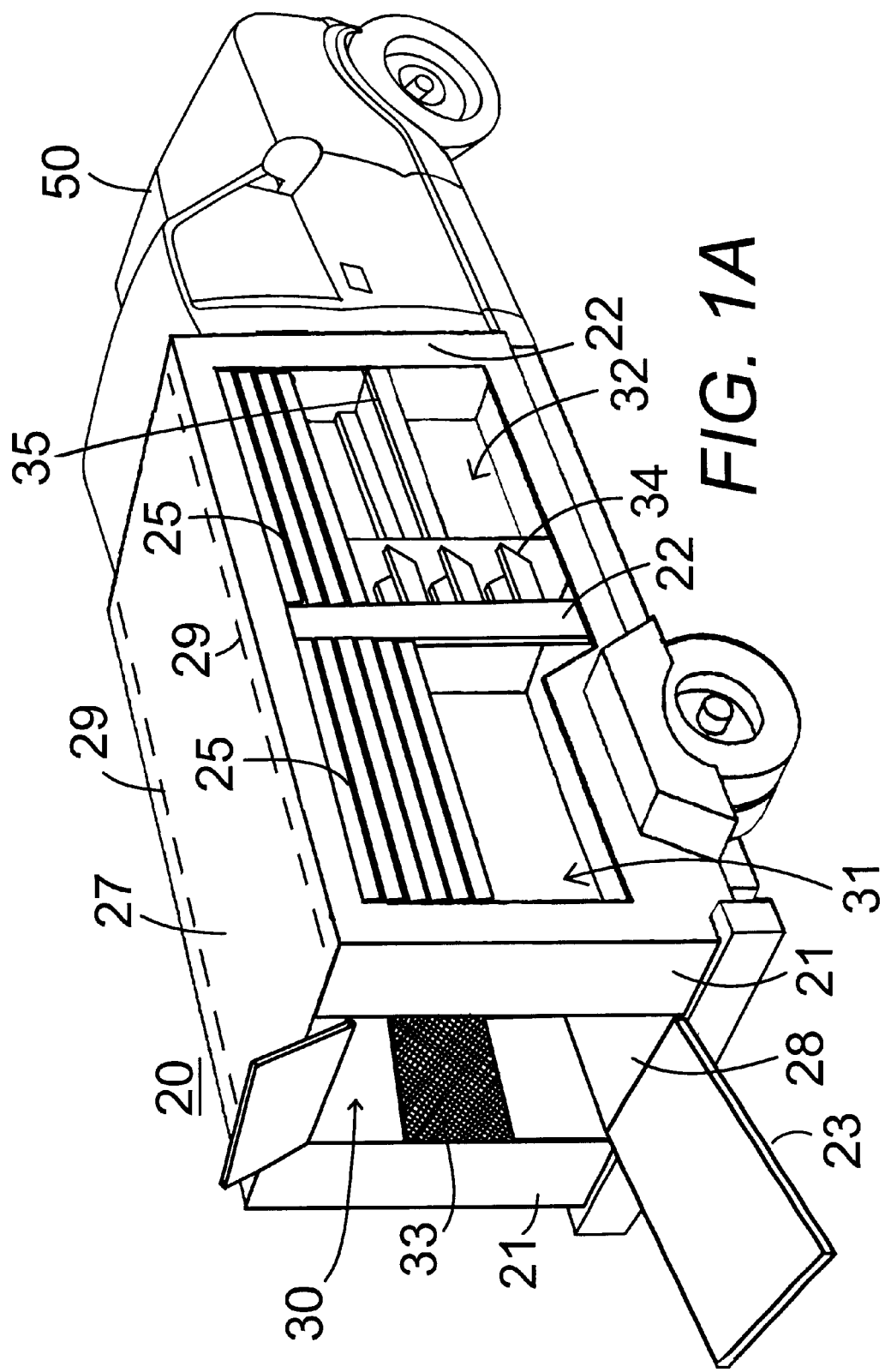
FIG. 1A is a perspective view of the modular utility trailer of the invention mounted on a truck bed of a truck.
Figure 2:
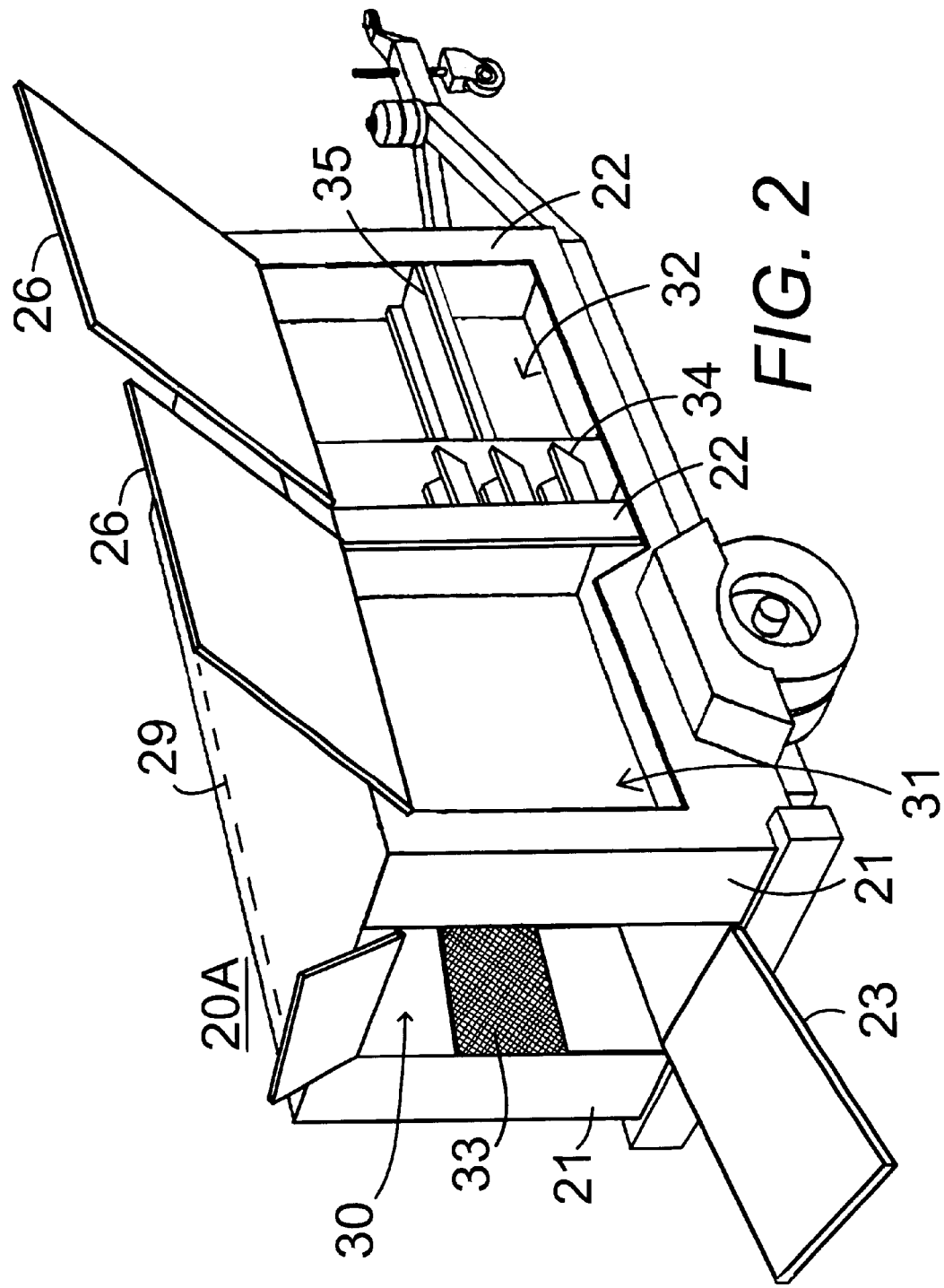
FIG. 2 is a perspective view of the modular utility trailer of the invention having swing-up doors.

In FIGS. 1, 1A, and 2, a modular utility transporter 20 and 20A with open access to all storage comprises a floor base 28 forming a part of a vehicular transport means, which may be a trailer or truck bed of a truck 50 as in FIG. 1A and a storage structure assembled on and secured to the floor base. The storage structure comprised of modular structural elements: structural panels 22 forming walls along the sides of the utility transporter with storage space and display openings 31 and 32 between panels and doors 25 and 26 covering the storage space and display openings between panels, structural channels 29 forming door supports and roof supports on top of the panels, and structural channels 34 and 35 between panels forming storage shelving means.

The panels 21 and 22 are preferably fiberglass reinforced structural panels with framing around them. A metal skin 27 is fastened over the top of the roof channels 29 to form the top of the trailer. This top in the preferred embodiment is waterproof.

Two panels 21 at one end of the utility transporter are spaced apart a sufficient distance to form a doorway 30 entrance into the utility transporter and a floor access space 28 extending from the doorway entrance along the length of the utility transporter to provide access to the interior space of the utility transporter so that the storage space and display openings 31 and 32 are accessible from the interior and the exterior of the utility transporter. A pivotable ramp 23 is capable of pivoting downwardly to form a ramp between the ground and the doorway entrance 30 and pivotable upwardly to form at least a portion of a door enclosing the doorway entrance 30.

Vertical wire mesh screens 33 between panels are used for hanging storage and display. V-channels 34 installed point down between panels form elongated bins for storage and display. U-channels 35 installed with sides upward between panels form shelving with sides.

In FIG. 1, the doors covering the storage space openings between panels comprise roll-up doors 25 for easy access to the storage and display spaces on the entire side at once with both doors up. These could be standard garage-type roll-up doors or durable metal storage type roll-up doors.

In FIG. 2, the doors covering the storage space openings between panels comprise swing-up doors 26 for easy access to the storage and display spaces on the entire side at once with both doors up. The swing up doors 26 would be made of the same fiberglass reinforced panels 21 and 22 that would be used on the body of the trailer. They would be hinged at the top and open up to rest horizontally above the storage opening 31 and 32 to form a canopy or roof when opened. The panels 21 and 22, and swing-up doors 26 have an aluminum or painted steel framing to give them rigidity and create a water proof flange when closed.

It is understood that the preceding description is given merely by way of illustration and not in limitation of the invention and that various modifications may be made thereto without departing from the spirit of the invention as claimed.

What is claimed is:

1. A modular utility transporter with open access to all storage and display spaces, the transporter comprising:

a floor base forming a part of a vehicular transport means;

a storage structure assembled on and secured to the floor base, the storage structure comprised of modular structural elements: structural panels forming walls along the sides of the utility transporter with storage and display space openings between panels and doors covering the storage and display space openings between panels, structural channels forming door supports and roof supports on top of the panels, and structural channels between panels forming storage and display shelving means;

wherein two panels at one end of the utility transporter are spaced apart a sufficient distance to form a doorway entrance into the utility transporter and a floor access space extending from the doorway entrance along the length of the utility transporter to provide access to the interior space of the utility transporter so that the storage and display space openings are accessible from the interior and the exterior of the utility transporter.

2. The utility transporter of claim 1 wherein the vehicular transport means comprises a trailer and the floor base is a floor bed of the trailer.

3. The utility transporter of claim 1 wherein the vehicular transport means comprises a truck and the floor base is a floor bed of the truck.

4. The utility transporter of claim 1 wherein the doorway entrance further comprises a pivotable ramp capable of pivoting downwardly to form a ramp between the ground and the doorway entrance and pivotable upwardly to form at least a portion of a door enclosing the doorway entrance.

5. The utility transporter of claim 1 further comprising vertical wire mesh screens between panels for hanging storage.

6. The utility transporter of claim 1 wherein the storage and display shelving means comprises at least one V-channel installed point down between panels to form an elongated bin.

7. The utility transporter of claim 1 wherein the storage and display shelving means comprises at least one U-channel installed with sides upward between panels to form shelving with sides.

8. The utility transporter of claim 1 wherein the doors covering the storage and display space openings between panels comprise roll-up doors.

9. The utility transporter of claim 1 wherein the doors covering the storage and display space openings between panels comprise swing-up doors.

10. The utility transporter of claim 1 wherein the panels are fiberglass reinforced structural panels with framing around them.

* * * * *